(12) United States Patent
Chien (10) Patent No.: US 8,408,736 B2
(45) Date of Patent: Apr. 2, 2013

(54) LED LIGHT HAS GEOMETRIC-UNIT(S) INCORPORATED WITH PROJECTION MEANS

(76) Inventor: Tseng-Lu Chien, Walnut, CA (US)

( * ) Notice: Subject to any disclaimer, the term of this patent is extended or adjusted under 35 U.S.C. 154(b) by 143 days.

(21) Appl. No.: 12/771,003

(22) Filed: Apr. 30, 2010

(65) Prior Publication Data

US 2010/0277089 A1  Nov. 4, 2010

(51) Int. Cl.
  *F21V 13/00*  (2006.01)
(52) U.S. Cl. ............ 362/235; 362/249.02; 362/249.11; 362/646

(58) Field of Classification Search .................. 362/800, 362/249.023, 249.11, 249.1, 646, 644, 269, 362/372

See application file for complete search history.

(56) References Cited

U.S. PATENT DOCUMENTS

| 5,630,663 | A  | * | 5/1997  | Ling et al. ............... 362/365 |
| 6,315,432 | B1 | * | 11/2001 | Kuo ........................ 362/287 |
| 7,040,783 | B1 | * | 5/2006  | Christianson ............. 362/396 |
| 7,682,042 | B2 | * | 3/2010  | Feinbloom et al. ...... 362/249.03 |

* cited by examiner

*Primary Examiner* — Anabel Ton
(74) *Attorney, Agent, or Firm* — Bacon & Thomas, PLLC (57) ABSTRACT

An LED light includes at least one geometric-unit(s) arranged to project light beams to illuminate different remote areas, and may further include LEDs for illuminating nearby areas.

18 Claims, 9 Drawing Sheets

2 projection in a ball with adjustable 135 degrees

LED LIGHT HAS GEOMETRIC-UNIT(S) INCORPORATED WITH PROJECTION MEANS

BACKGROUND OF THE INVENTION

The subject matter of this application is related to or includes subject matter in common with the inventor's U.S. patent application Ser. Nos. 12/624,621, 12/622,100, 12/318, 471, 12/318,470, 12/318,473, 12/292,153, 12/232,505, 12/232,035, 12/149,963, 12/149,964, 12/073,095, 12/073, 889, 12/007,076, 12/003,691, 12/003,809, 11/806,711, 11/806,285, 11/806,284, 11/566,322, 11/527,628, 11,527,629, 11/498,874, 12/545,992, 12/806,711, 12/806, 285, 12/806,284, 12/566,322, 12/527,628, 12/527,629, 12/527,631, 12/502,661, 11/498,881, 11/255,981, 11/184, 771, 11/152,063, 11/094,215, 11/092,742, 11/092,741, 11/094,156. 11/094,155. 10/954,189, 10/902,123, 10/883, 719, 10/883,747, 10/341,519, 12/545,992, 12/292,580, 12/710,918, 12/710,561, and 12/711,456.

The above-listed related applications apply physics and optics theory to provide LED lights for outdoor or indoor applications that are powered by alternating current (AC) or direct current (DC) from an electric cord and plug, battery, transformer, or solar or other power source to create a plurality of LED light beams that illuminate close areas and in arrangements incorporating projection means, remote areas. The present invention also utilizes these principles and may further incorporate other features described in the above-listed applications, such as the inclusion of more than one light source, more than one function, more than one optics means, and/or more than one projection means as well as the utilization of power saving and cost saving concepts.

The current invention offers improvements that are especially useful for a security light, power fail light, evacuation light, but that are also suitable for any other indoor light or outdoor lighting powered by home electricity, a battery power source, or another power source and that provides illumination for a plurality of areas illumination from a single LED light device having a predetermined brightness, color, and/or size and relatively low cost. In particular, the LED light device of the current invention may include one or more of the following features:

(1) The LED light device of the present invention may include more than one projection arrangement in a single geometric unit. The geometric unit is a light assembly including parts that may be selected from LED means, optics means, lens means, focus adjustment means, container means, position and orientation means, tubular means, sealing means, mechanical construction means, groove means, openings, cutouts, windows, and plastic means to cause the LED light means to emit light beams to desired distance and provide area illumination with a desired brightness, size, color, function, and performance.

(2) The geometric unit(s) of the LED light device may have the features, functions, and construction of a security light, power fail light, or any other indoor or outdoor light.

(3) The projection function(s) of the LED light device enable the light to be visible at a desired distance so without the need for super power or high power LEDs that waste a lot of energy. The conventional light device normally offers illumination from the said LED light source to a limited distance such as 10 feet (3 meters). Currently, illumination over a longer distance is required, such as 30 feet (10 meters), the only way is to add a super or high power LED, such as a 1 Watt, 3 Watt, 5 Watt or more higher power LED. The light device of the present invention can illuminate at a distance of 30 feet without using such a high power LED.

(4) The current invention applies projection theory to an optics lens and related parts to area lighting from a geometric-unit over a predetermined distance so that, for example, a geometric-unit hung on the top of garage door can project light to a far away driveway, fence, garden walls, or mail box with three-position light illumination, but without illuminating the areas surrounding the garage door or the location around the geometric-unit. Thus, the light device can project the light through appropriate optics means to provide illumination of remote locations using LED light sources that need less power.

(5) The inclusion of more than one projection function in one geometric-unit means that the geometric-unit can project light to more than one distant area for illumination.

(6) The inclusion of more than one projection function in one geometric-unit also means that each of the projection means can change its relative position or orientation so people can aim the projection means in different directions. These position or orientation changeable features are highly advantageous and not available in conventional LED light devices.

(7) Adjusting or changing the position or orientations of different projection means can be achieved by using plastic means, a groove, openings, windows, and/or cutouts for each of the projection means.

(8) The current invention may also provide one LED light device having a plurality of illumination areas, but in which the number of illumination areas need not be the same as the number of geometric-units because each geometric-unit already has a plurality of projection means to provide a plurality of projection functions. Currently marked LED lamp assemblies only offer one illumination area so that each LED assembly (as opposed to LED device) can only have one illumination area that is not a distinct or separate area). In contrast, the current invention can have one LED light device with two geometric-units, each geometric-unit having three projection means for a total, in one LED light device, of 2×3=6 projection functions through six projection means to illuminate six remote areas.

(9) The current invention can also illuminate near-by or surrounding areas to maintain conventional LED features, thereby providing current market unit functions in addition to, for example, illumination of six different remote areas to offer people more safety and more location illumination.

(10) In the preferred geometric-units with multiple projection means, the LED(s) of each projection means can be turned-on or turned-off under control of a switch. For example, in the case of two geometric-units with three projection means having one or more LEDs inside, each projection means can be turned on or off by individual switches so that if people only want to illuminate 5, 4, 3, 2, or 1 distant-areas, they can simply turn off rest of 1, 2, 3, 4, or 5 of the projection means.

(11) The LED light device having more than one projection means per geometric-unit can use circuit means to cause the LED(s) to turn on and function as a night light, power fail light, emergency light, motion sensor light, flash light, any indoor lighting, any outdoor lighting, or any transportation equipment lighting (for car, truck, boat, vessel, or airplane), and may incorporate any one or more of a sensor means, switch means, motion sensor, movement sensor, flood sensor, humidity sensor, earthquake sensor, power failure sensor, sound sensor, photo sensor, and/or power saving circuit (for example the circuit described in the inventor's previous patent applications using rapid flashing to provide a persistence of vision effect so that eyes cannot tell that the light is flashing while achieving power saving).

(12) The projection means of the preferred embodiments may have specifications that allow the plurality of the projection means and its parts to freely move or change position or orientation to provide a variety of projection functions.

(13) Each of the projection means of the preferred embodiments can provide a different projection distance, brightness, illumination area size, color, and/or light intensity based on industrial requirements.

(14) The light device of the current invention may be powered by home electricity, battery power, a solar module, wind power, water power, chemical power, and/or manual/human power, with energy saving kits and proper accessories to enable the LED light device to be used anywhere.

In addition to the above-described features, the light device of the current invention may use numerous other conventional light device features, as well as the following features (A) to (K) described in other patent applications and patents of the current inventor:

A. The LED light device may include more than one optics means of the type described in U.S. patent application Ser. No. 11/806,284, in which first LED elements are incorporated with an optics medium to cause the LED elements to provide good photometric area light illumination and act as night light.

B. The LED light device may include multiple light sources of the type described in U.S. patent application Ser. No. 11/255,981, in which first and second LED elements are arranged in a matrix shape and face in at least one or multiple directions, and/or have one or more different positions, orientations, and/or locations, for example to enable some LEDs to act as a night light and some LEDs to act as an emergency light.

C. The LED light device may, as also described in U.S. patent application Ser. No. 11/255,981, include first and second LED elements having a plurality of individual LEDs that face in more than one direction or have different locations, positions, or orientations.

D. The LED light device may further include one of a mechanical or electric switch having functions selected from on, off, auto, timer, time delay, flashing, partial on, partial off, partial flash, partial chasing, Partial random, partial fade-in and fade-out, duration of ON and OFF of each blinking function, power saving selection, blinking function selection, persistence of vision effects, blinking, on and off percentage of each blinking cycle, power saving setting or selection, group reset selection, or any LED light functions for a plurality of LEDs available from the marketplace.

E. The LEDs of the light device can be any type of LED specification, for example single multiple color LEDs, and the color or number of illuminated LEDs can be changed to provide different light functions by means of a controller, switch, and/or sensor means as described for example in U.S. patent application Ser. No. 11/806,285.

F. The LED light device may also include the multiple functions described in U.S. patent application Ser. No. 11/806,285, including functions of an electrical outlet, air freshener, motion sensor, beacon light, warning light, chasing lights, flash light, bug repelling device, mosquito repelling device, mouse repelling device, and/or sonic repelling device.

G. The LED light device may also include additional LED or LEDs as disclosed in U.S. patent application Ser. No. 11/255,981 for indicating battery status, including low battery capacity, full capacity, or half capacity with preferred colors to indicate the status of the batteries, or show the device on duty status.

H. When the LED light device utilizes a persistence of vision effect, the flash timing should be faster than the eye response time of within $1/24$ to $1/16$ second to cause people to see a continuous light beam while reducing power consumption.

I. Preferably the flashing rate, if a persistence of vision effect is used, will be less than $1/48$ second or a frequency of greater than 48 Hz.

J. The LED light device may includes batteries with a voltage higher than the LED trigger voltage, or batteries having a voltage lower than the LED trigger voltage while incorporating a voltage boosting electric circuit to raise the battery voltage up to the LED trigger voltage.

K. The LED light device may utilize circuit means, conductive means, electric components parts and accessories, switch means, sensor means, an integrated circuit (IC), or a micro controller to connect with a conventional market-available power source to make the LED or LEDs turn on and turn off to achieve a predetermined function, effects, duty cycle, color, or brightness.

BRIEF DESCRIPTION OF THE DRAWINGS

FIGS. 8, 8-1, 8-2, and 9 show a third preferred embodiment having three projection means in a single geometric-unit.

FIG. 14A shows a construction of the tenth preferred embodiment.

FIGS. 15-1 and 15-2 shows variations of the embodiments of FIGS. 11, 12C, 13, and 14 with different power sources, with FIGS. 15-2 showing a battery operated unit.

FIGS. 16-1 shows the embodiment of FIG. 10, with a motion sensor and an AC or DC power source.

FIGS. 16-2 shows the embodiment of FIG. 10 with a battery power source.

FIGS. 16-3 shows the embodiment of FIG. 10 connected by an electric-cord and plug to an AC outlet.

DETAILED DESCRIPTION OF THE PREFERRED EMBODIMENTS

The preferred embodiments of the current invention provides an LED light that not only provides a light beam to close area(s) for illumination, but also incorporates projection means to project a light beam to remote areas for illumination using a relatively low power LED. This is big improvement over the conventional light device which use higher-power LEDs from 1/10 watt to 0.25 W, 0.5 W, 1 W, 2 W, 3 W, 5 W, 8 W, 10 W or more.

In order to provide a wider or bigger illumination area, conventional LED light devices use higher and higher power LED(s). This is the traditional way adapting the LED light device for such indoor or outdoor applications as a security light, power fail light, emergency light, evacuation light, emergency flash light, or any other LED lighting used indoors or outdoors of a house, building, boat, vessel, ship, airplane or any lodging or transportation equipment(s). The result is an LED light with higher cost for the high-power LED units, a big heat problem, or high power consumption equivalent to that of halogen bulbs.

The current invention controls the light beam properties by means of an optics lens with a desired focus so as to provide the far-away area(s) with good illumination despite requiring lower-power LED means.

The current invention also provides a way to include more than one projection means in just one geometric-unit to project more than one light beam to different remote areas for illumination.

The current invention may apply to any existing LED light for indoor and outdoor use, for any purpose including one or more of the following: night light, power fail light, emergency light, security light, motion sensor light, hazard warning light (earthquake sensing, flood sensing, mud flow sensing, fire sensing, ash sensing, dust sensing, any application related to hazard warning by an LED light device or combination of light devices), working lamp, garden light, seasonal light, ceiling light, stair light, garage light, traffic light, street light, public zone lighting, swimming pool lighting, patio light, and garden light, which may be powered by household electricity, batteries, a transformer, a generator, or alternative source of electricity including solar power, wind power, water power, coal power, chemical power, or geothermal power connected by conventional skill such as by any combination of an electric-cord with plug, conductive prongs, conductive piece, wires, string, and/or springs to cause the LED light to turn on and off according to pre-determined functions, time, duration, duty cycle, or frequency (for example, by quickly flashing much faster than the human eye's response time of 1/16 seconds).

Hence, the current invention solves a lot of problems because people want LED lights to have a large area of illumination and to a large distance.

Figures 1, 2, 3:
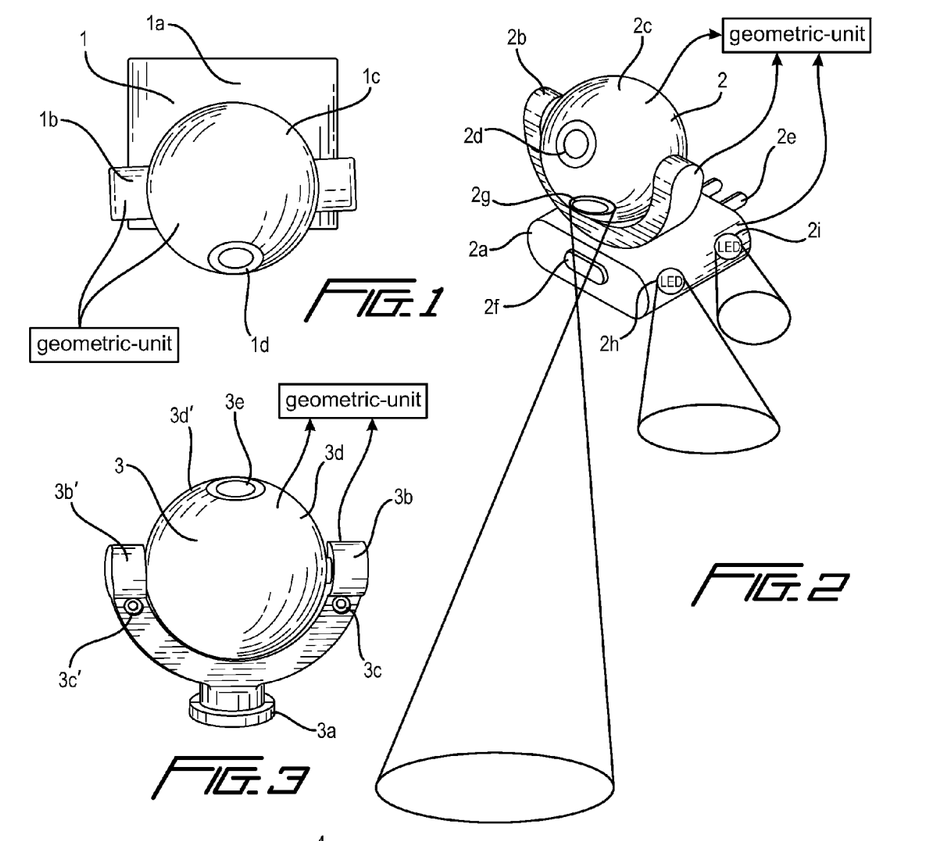
FIG. 1 shows a first preferred embodiment of the current invention including a geometric-unit(s) that incorporates a projection means.
FIG. 2 shows a version of the first preferred embodiment in which the LED(s) provide conventional nearby illumination that depends on the power of the LED(s), and also projection means with LED(s) that use optics means to illuminate distant area(s).
FIG. 3 shows a geometric-unit according to the first preferred embodiment, together with projection means, and electricity delivery from the main housing to the projection means.

As shown in FIG. 1, LED light (1) has a body (1a) with a geometric-unit (1c) which can freely rotate 360 degrees about an x-axis and is installed on a Y-shape frame (1b) having a base that allow 360 degree rotation about the y-axis. One of the projection means (1d) is arranged on the geometric-unit (1c). Because there are two degrees of rotational freedom for the geometric-unit and base of the Y-frame, the project means can change its position and orientation along the x-axis and y-axis to illuminate desired remote area(s).

In summary, the LED light of this embodiment has geometric-unit(s) that incorporate projection means, the projection means and geometric-unit being constructed to enable the projection means and geometric-unit(s) to rotate from 0 to 360 degrees about any combination of an x-axis, y-axis, and z-axis.

As shown in FIG. 2, an alternative LED light (2) with projection means, has a geometric-unit (2c) installed on the Y-frame (2b) and both can freely rotate along the x-axis or y-axis depend on whether the Y-frame faces the sky or walls. The LED light has a body (2a) that has space to install LED means (2h) and (2i) for illuminating close areas. Because the power of LED means (2i) is less than 1/10 W, the illuminated-area is very small as shown. LED means (2h) is much more powerful, for example 1, 2, 3, 5, 8, 10 or more watts so the area illuminated will be much farther away from the LED means (2h), but with more power consumption or more heat. The LED means (2h) (2i) can be any specification for LED, which can be any size, light output, or any number of LEDs to enable the preferred LED assembly to provide a desired light output, brightness, and/or color with the assistance of a front lens.

The geometric-unit(s) with projection means shown in FIG. 2 may include any number of LEDs from one to N, arranged in any pattern such as a linear, dot-matrix, curved, or hill-like installation pattern, optionally with reflective means to provide the desired light pattern(s). However, unlike LED light means (2d) and (2g) described below, the LED light means (2i) and (2h) of FIG. 2 do not incorporate the parts like the current invention's projection means for providing illumination of remote areas, and in particular an optics means, lens, convex lens, concave lens, tubular means, adjustable focus means, LED fixing means, and/or light block means arranged to cause light beams from the LED(s) to illuminate distant area(s) of pre-determined size, brightness, color, shape, dimensions, direction, and/or distance.

The projection means (2d) and (2g), on the other hand, add the following combination of features to the light device of FIG. 2: (1) at least one of LED as light means to offer light beams to viewer. (2) at least one geometric-unit(s) 2 incorporated with LED(s) projection means (2d) and (2g) for illumination of distant areas which are remote from the LED light source position. (3) The projection means (2d) and (2g) incorporate projection elements such as an optics means, lens, convex lens, concave lens, tubular means, adjustable focus means, LED fixing means, and light block that are designed to cause the LED(s) to emit light beams to distant area(s) for area illumination having a pre-determined size, brightness, color, shape, dimensions, direction, and/or distance. (4) The geometric-unit(s) may be made of metal, die-casting, plastic, rubber, or another preferred material. (5) The LED(s) may be powered and controlled by any suitable power source, circuit means, sensor means, switch means, integrated circuit (IC), detector means, electric parts, and accessories connected by an electric cord and plug, outlet prongs, batteries, and other conductive means to cause the LED(s) to turn-on and turn-off according to a predetermined function, timing, period of time, brightness, duty cycle, frequency and power-saving effect. (6) The LED light of FIG. 2 may serve as a power fail light, security light, motion sensor light, evacuation light, emergency light, battery operated light, AC powered light for indoor or outdoor use, including use in a home, building, industrial area, vehicle, boat, vessel, or airplane. (7) The power source may use AC or DC and/or a transformer or adaptor, or get power from a solar, wind, or chemical power source. (8) The projection means (2d) and (2g) only projects the LED light beams to distant areas. (9) The LEDs (2h) and (2i) illuminate areas close to the light device so that the light device can achieve remote and nearby area illumination with desired LED light functions, features, and performance.

As described above, the light device of FIG. 2 includes LED means (2h) (2i) and an LED inside projection means (2d) and (2g) to project light beams to enable illumination at a different distance, size, and light intensity. As a result, the LED light can offer more than one area illumination at different distances from the position of the light device, with the projection means illuminating remote area(s) and other LED(s) means to illuminate area(s) which are close to the LED light device.

As shown in FIG. 2, the power source is from an outlet (not shown) and the LED light has prongs (2e) to connect with the outlet so as to get power from the outlet. The LED means (2h) (2i) can act as a night light when the environment becomes dark by using a sensor means (not shown) to trigger an inside circuit means (not shown) to turn-on the night light LEDs (2h) (2i) and provide a floor light to offer illumination to people. When the circuit means detects a power failure due to lack of electricity at the prongs, the circuit means will turn on the two projection means (2d) (2g) to project the light beam to a desired location for remote area illumination purposes. At this time, the two projection means LEDs will use a self-powered arrangement such as rechargeable batteries or non-rechargeable batteries to supply electricity to the projection means LEDs. The LED light also can work with other DC or AC power sources such as a transformer or energy saving device utilizing solar, wind, chemical, or geothermal power to supply electricity to the illustrated LED light to provide a power fail light, security light, motion sensor light, evacuation light, emergency light, battery operated light, or AC powered light for use indoors or outdoors or in a home, building, industrial area, vehicle, boat, vessel, or airplane.

FIG. 3 shows a preferred LED light (3) having a single projection means (3e) in a geometric-unit (3d) installed on a y-frame (3a).

Figure 4:
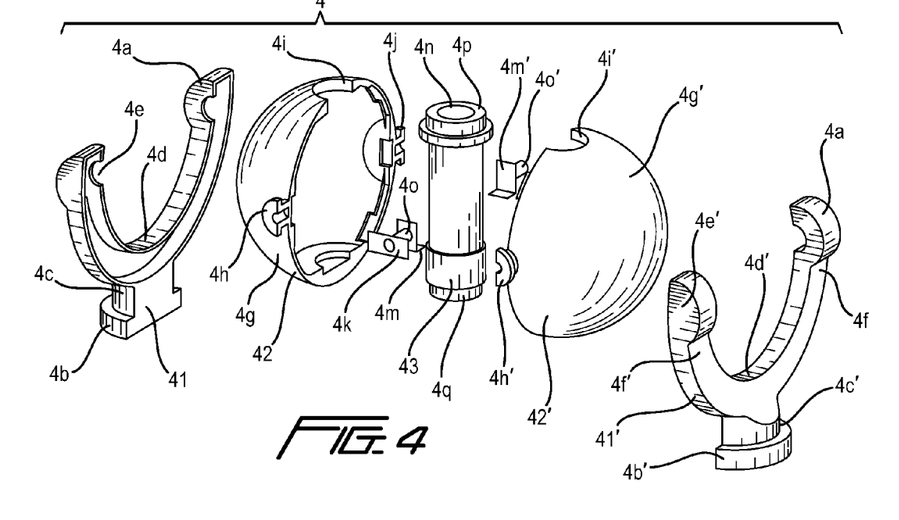
FIG. 4 shows a second preferred embodiment that includes first and second LED elements, a printed circuit board (PCB), and conductive means, the first LED element(s) providing a night light and the second LED element(s) providing an emergency light, with a color select switch, motion sensor, function switch, and an optics lens.

FIG. 4 shows a preferred single projection means (43) for a geometric-unit having two semi-spherical parts (42) (42') connected by two pair of catches (4h) (4h') and (4j) (4j'). The 2 pairs of catches are also assembled with the two y-Frames (41)(41') and form an electric connection though the conductive means (4o) (4k) (4m) and (4o') (4k') (4m') to deliver an electric signal from the body (not shown) through conductive wires, conductive springs, or other conductive means to the projection means LED(s) which are inside the end of the tubular compartment (4q). The projection means have optics means within the tubular compartment (4q) with light block out means so that the inner LED light beams do not leak out and so that all the light beams pass through the desired combination of optics means, such as a lens, convex lens, concave lens, tubular means, adjustable focus means, LED fixing means, and light block means, to cause the light beams to be emitted to distant area(s) for area illumination with a predetermined size, brightness, color, shape, dimensions, directions, and/or distance.

Figures 5, 6:
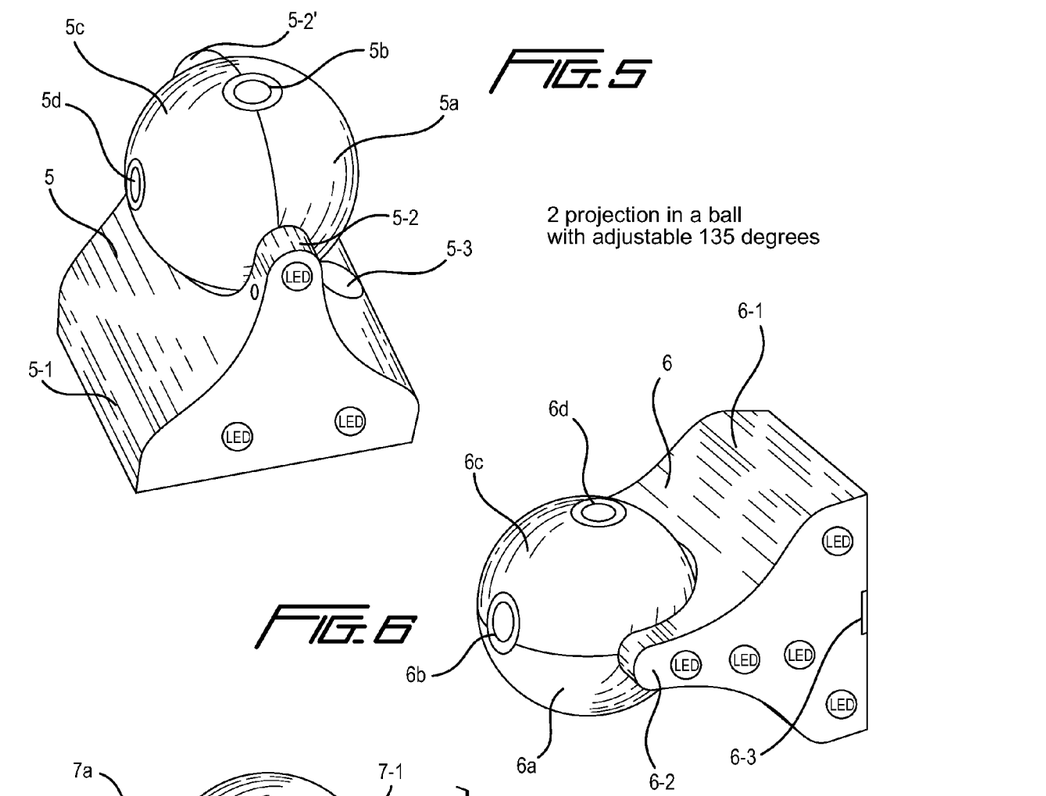
FIGS. 5 to 7 show a version of the second preferred embodiment having two projection means in one geometric-unit.

FIG. 5 shows an LED light (5) having a geometric-unit (5a) with two project means (5b) and (5d). The main projection means (5b) are installed on two semi-spherical parts as in FIG. 4. The added second projection means (5d) are installed on a third semi-spherical shell (5c) at a center position. The third semi-spherical shell (5c) has a larger inner diameter than the outer diameter of the first and second semi-spherical parts (5a) (5a') so that it can overlay the top of the ball formed by the first and second semi-spherical parts. The third semi-sphere (5c) assembly has two catches for the ball (5a) so the ball (5a) can rotate through a certain angle and change the relative positions of the second projection means (5d) and the main project means (5b).

As shown in FIG. 5, the extra LED means on the side body of the LED light, which are similar to those of FIG. 2, offer illumination from the LED means to close area(s), in contrast to the illumination offered by the projection means (5b) (5d).

FIG. 6 a light device that is identical to that of FIG. 5 but the y-frame may be positioned on walls, whereas the y-frame of the light device of FIG. 5 is arranged to be positioned on the ground.

Figure 7:
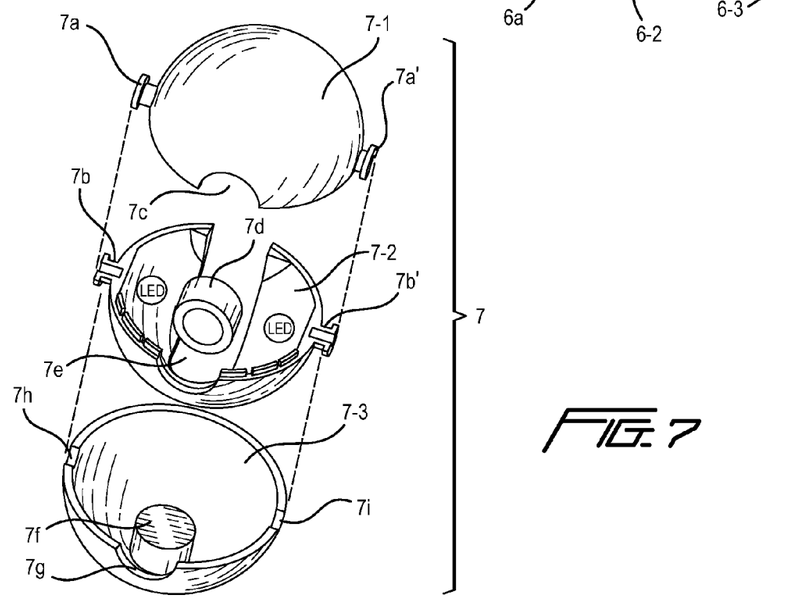

FIG. 7 shows a second projection means (7f) that can change position because the ball is made up of two semi-spheres (7-1) (7-2) having moving groove(s) (7e), opening(s), cutout(s), or window(s) to allow the position of the added projection means (7f) to be adjustable. The added shell, shield, or cover (7-3) utilizes an over-layer(s) or under-layer(s) arrangement to keep the shell (7e), which may include plastic piece(s), metal piece(s), and/or a cover, to keep the groove(s), opening(s), cutout(s), or window(s) hidden at all times to prevent any parts that carry electricity from being touched by people. The shell (7-3) has two ears (7h) (7i) that assemble to the two catches (7b) (7b') to allow free rotation for through a predetermined number of degrees along the neck of the two catches (7b) (7b'). The shell (7-3) has one cutout (7g) to enable the main project means (7d) to fit within so that it does not block out the main project means (7d). The two main semi-spheres (7-1) (7-2) are assembled with the two catch means (7a)(7b) and (7a')(7b') to hold the main project means (7d).

It can be understood from FIG. 7 that the LED light of this embodiment has a geometric-unit incorporated with projection means, the geometric-unit having plurality of the projection means, some of which can change position, orientation, and/or distance with respect to some of the other projection means. In addition, the LED light is arranged so that the projection means do not interfere with each other despite their mutually adjustable position, orientation, and/or direction.

Figures 8, 9, 81, 82:
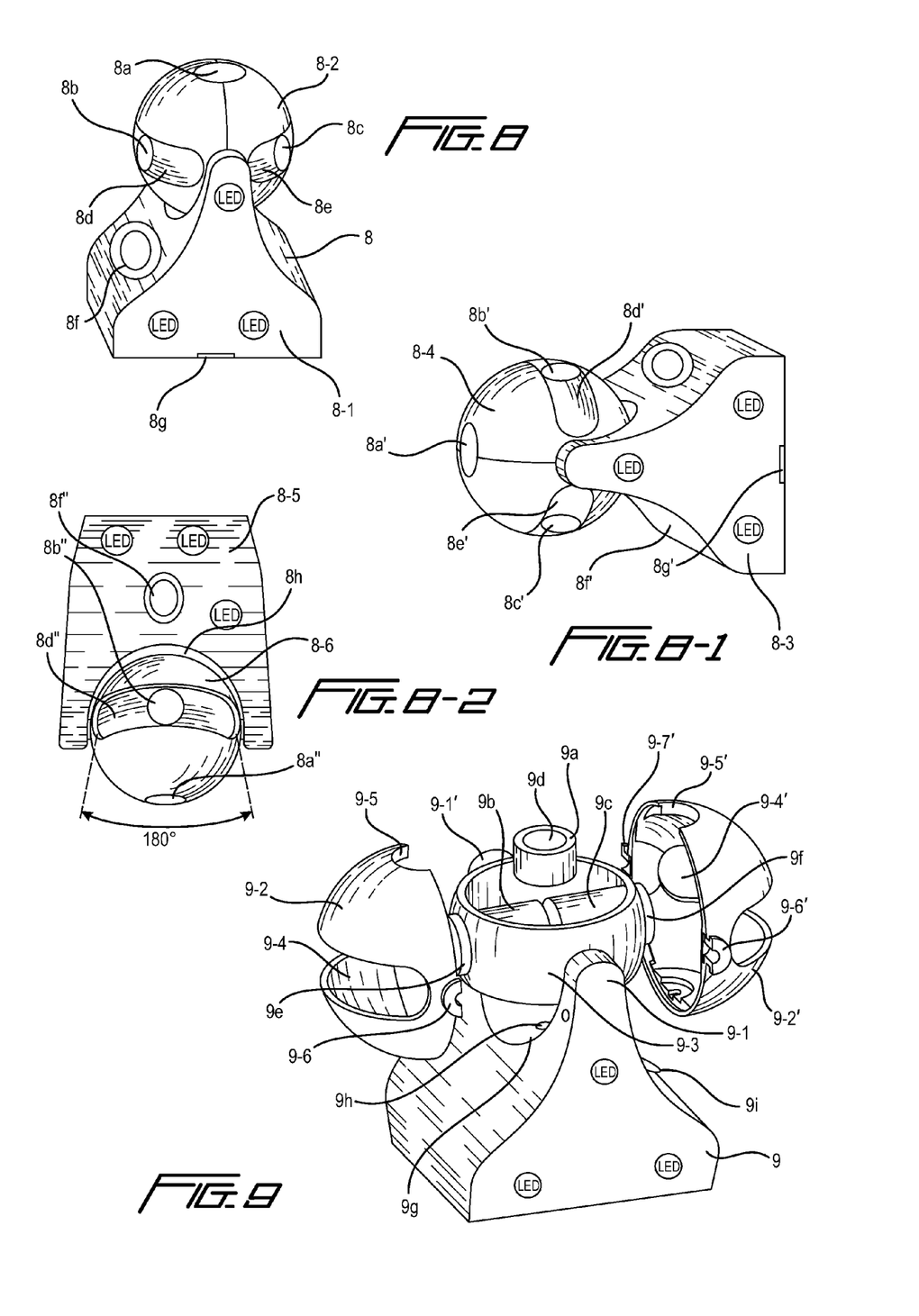

FIG. 8 shows an alternative to the embodiment of FIGS. 5 and 6, which has two projection means in the geometric-unit. The geometric-unit of FIG. 8 has three projection means (8a) (8b) (8c). The main projection means (8a) is arranged on the geometric-unit (8-2) and two added projection means (8b) (8c) fit within the geometric-unit's (8-2) moving grooves and include shells (8d) (8e) to cover the openings to prevent people from touching any inner components. The positions of the two added projection means (8b)(8c) can be adjusted from end to end through an angle of 180 degrees about a common axis. The y-frame shown in FIG. 8 faces up so the two added projection means can freely move along the y-axis. The y-frame of FIG. 8-1, on the other hand, faces to the side so the two added projection means (8b)(8c) can freely move about the x-axis. The y-frame orientation will affect the projection means' position and orientation. Also, the geometric-units (8-2) and (8-4) and y-frame base can also both freely rotate up to 360 degrees to change the position or orientation of the two added projection means about any of the x-axis, or y-axis or z-axis.

FIGS. 8-2 further illustrates how the position of the added projection means may be adjusted from end to end through a 180 degree angle on the base or y-frame to change position or orientation change along any of the x-y-z axes. Also, the extra LED means offers illumination certain nearby areas as discussed above. FIGS. 8, 8-1, and 8-2 thus show the relation of the different projection means to the base, y-frame, and geometric-unit in different positions and orientations to explain how the current LED light can have x-y-z position or orientation changeable features with respect to each of the projection means.

FIG. 9 shows a plurality of projection means (9d)(9e)(9f), each in one geometric-unit of the general type shown in FIGS. 8 and 8-1. The main projection means (9d) is installed within the two semi-spherical shells (9-2) (9-2'), each having a moving groove (9-4) (9-4') to allow an inner annular-shaped shell (9-3) to be arranged as an under-lay fixed on the inner of the two semi-sphere shells (9-2) (9-2'). Two of the added projection means are installed on the annular-shaped shell (9-3) at opposite positions so that while one of the added projection means (9e) moves to the left, the other added projection means will move to the right. It is to be appreciated that the annular-shaped shell (9-3) can be made up of two separate arc-shape shell pieces with under-layed and over-layed arrangement so the positions of the two added projection means (9e) (9f) can be individually adjusted without affecting or interfering with each other. More projection means can be added using this over-layed and under-layed arrangement as long as all of the different levels of the added projection means shell have been well designed. Such inclusion of a plurality of additional projection means on one geometric-unit by conventional skills will still fall within the current invention scope. The over-layed and under-layed shells make up one way to make such arrangement, but alternative or equivalent constructions will still fall within the scope of the current invention.

In the arrangement of FIG. 9, each projection means has an accurately-designed tubular means with inner optics means so that the plurality of projection means will not interfere with each other.

Figure 10:
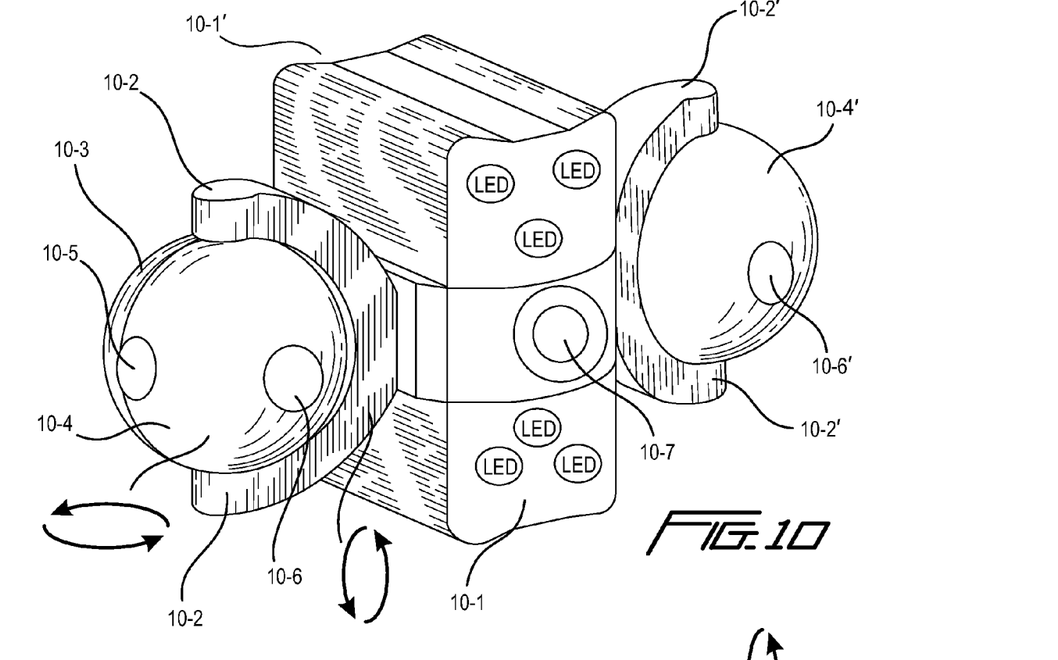
FIGS. 10, 11, 12A, 12B, 12C, 13, and 14 show fourth through tenth preferred embodiments in which the light device serves as a security light, power fail light, AC powered outdoor light, DC powered motion responsive outdoor or indoor light that may take the form of a sensor light, emergency light, power fail light, evacuation light, or multiple function night light.
Figure 11:
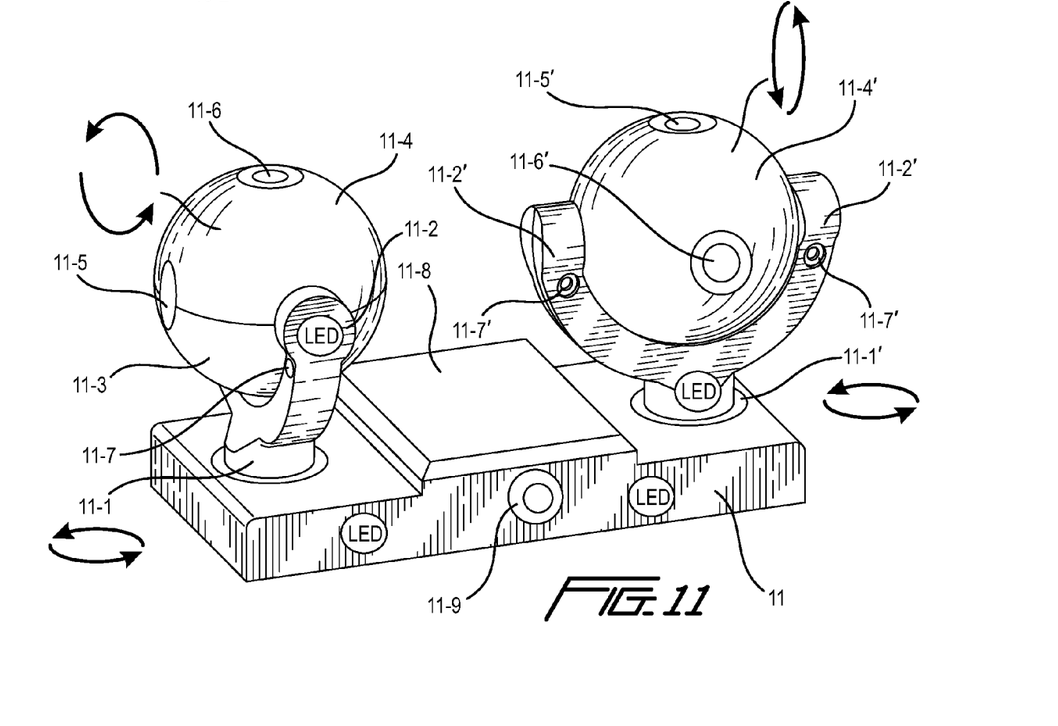

FIG. 10 shows a preferred LED light having a body (10-1') which can use outlet electricity, or battery power, or power from a transformer, generator, or adaptor arranged to get energy from solar, wind, water, chemical, or geothermal resources and a storage device to supply electric power to the LED light system to provide a desired function. The power source is connected with the LED light by an electric-cord and plug, by prongs, or by other conductive means to deliver electricity from the power source to a circuit means, sensor means, switch means, integrated circuit, and other electric parts and accessories and cause the LED means to turn on and off according to a pre-determined function(s), performance, duty cycle, frequency, and/or duration.

The Body (10-1') has two y-frames (10-2') (10-2') which can have a desired rotating angle from 0 to 360 for free rotation about the base. Each of the y-frames (10-2') (10-2') has one geometric-unit (10-3') (10-3') which has a main projection means (10-5') (10-5') and added projection means (10-6') (10-6') on semi-spherical shells (10-4') (10-4'). Both semi-spherical shells (10-4') (10-4') can be freely moved over an angle of from 0 to 90 degrees so as to change the position and orientation relative to the main projection means (10-5') (10-5'). The body (10-1') also has extra LED means on the front face to provide illumination of nearby area(s). Sensor means (10-7') installed on the body have, by way of example, a horizontal sensor range of 10 to 180 degrees and a vertical sensor range of 10 to 180 degrees, or any other range available from the marketplace. It is also within the scope of the invention to use more than one sensor means or switch means to cause the LED light to have desired functions. The plurality of projection means (10-5') (10-5') (10-6') (10-6') may each also have its own individual switch to control a respective projection means LED. The projection means LED can be individually cut off or connected with the power supply system because some users may not need so many projection means, reducing power consumption.

Applications of the light device of FIG. 10 include a power fail light, security light, motion sensor light, evacuation light, emergency light, battery operated light, AC powered light, and direct DC powered light (for example, supplied b a solar, wind, water, chemical, or geothermal power source through a storage device), for use indoors or outdoors and in a home, building, industrial area, vehicle, boat, vessel, or airplane. As with the light device of FIGS. 11, 12A, 12B, 12C, and 13, the light device can be used in other applications and utilize any available source of power. The preferred light device can also be used in any combination of the above-discussed different kinds of lights to become a multiple function LED light device that includes a geometric-unit with projection means. All such variations and modifications are intended to still fall within the scope of the current invention.

Figure 14:
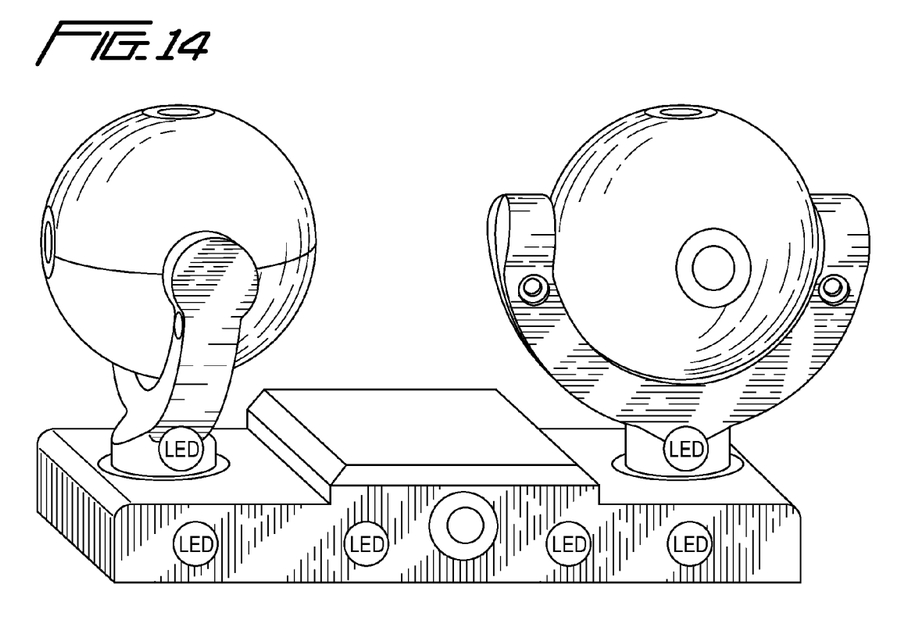

FIGS. 14-1 shows details of the construction of the light devices of FIG. 11, 12C, 13, 14, The LED light body (14-1) has two y-frames (14-4) (14-4') installed in one of geometric-units (14-5) (14-5'). Each geometric-unit has projection means (14-7') with optics means (14-9) (14-9') within two semi-spherical shells (14-5) (14-5') and one semi-spherical shell (14-6a) having added project means (14-7). The added projection means fit within the semi-spherical shell (14-5a) moving groove (14-5d) so as to enable a position change. The body (14-1) has holes (14-4b) (14-4b') to receive y-frame bases (14-4a) (14-4a') and assemble them with round stoppers (14-4c) (14-c') so as to enable the y-frame base to be freely rotated from 0 to 360 degrees. The round stopper has channels (14-4e) (14-4e') to allow conductive wires or screws to be arranged through these channels to deliver electric power and provide fastening functions. The body (14-1) has a compartment (14-3) to offer space to install selected parts and accessories in any combination, such as a circuit board (14-2), battery contacts (not shown), batteries, sensor means, switch means, a power cord and plug, retractable prongs, fixed prongs, individual switches for each LED(s), extra LED(s), or other electric components within the body. The body (14-1) has a base cover (14-1a) to cover all inner parts and accessories to prevent people from touching them. The base cover (14-1a) has an opening (14-1b) to install a battery door to allow people to change batteries as needed. The base cover has openings, windows, or holes to provide ventilation for heat from inner electric parts or the extra LED(s), or to allow screws to fasten with the base body (14-1).

Figure 141:
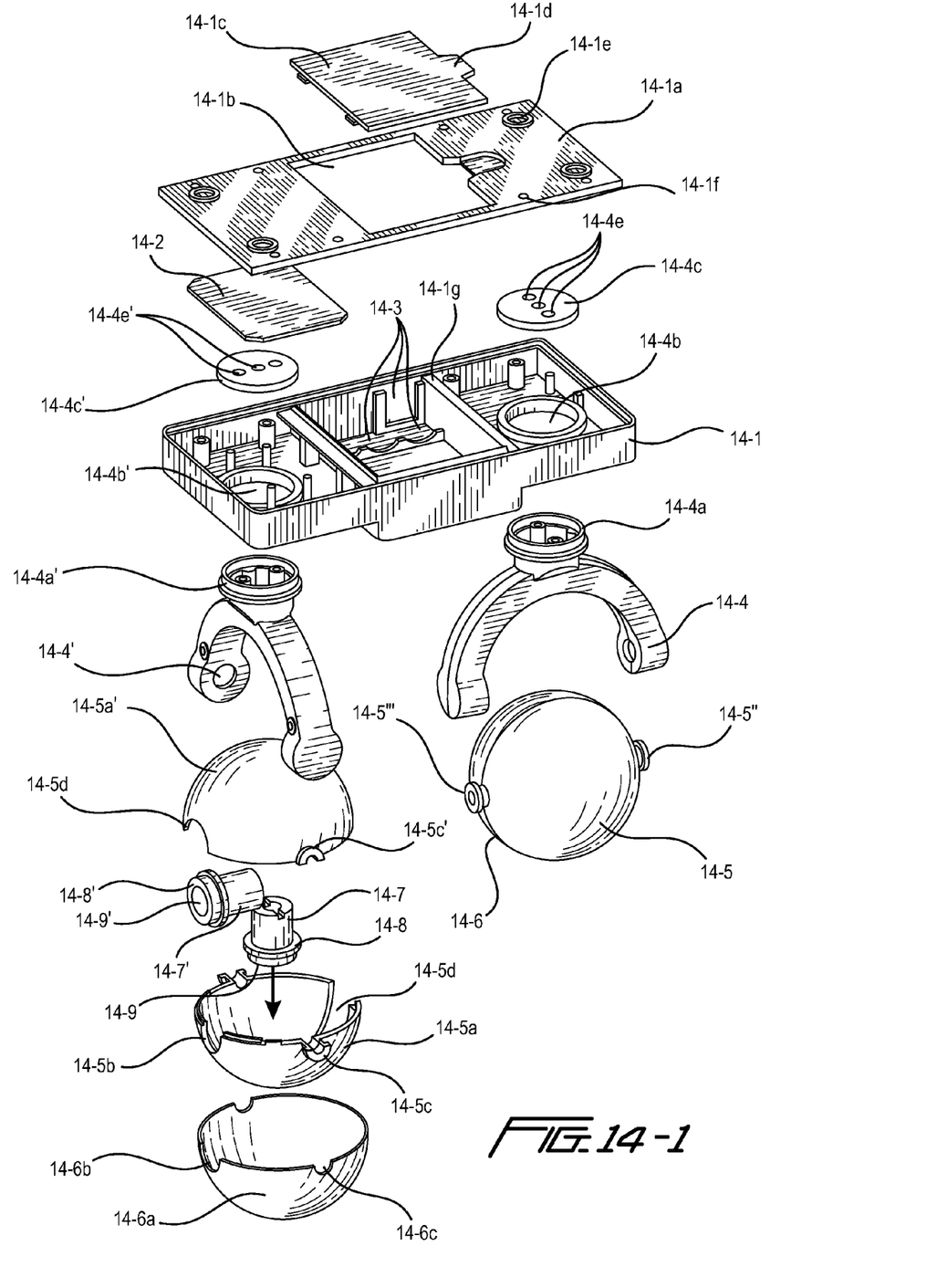
Figure 151:
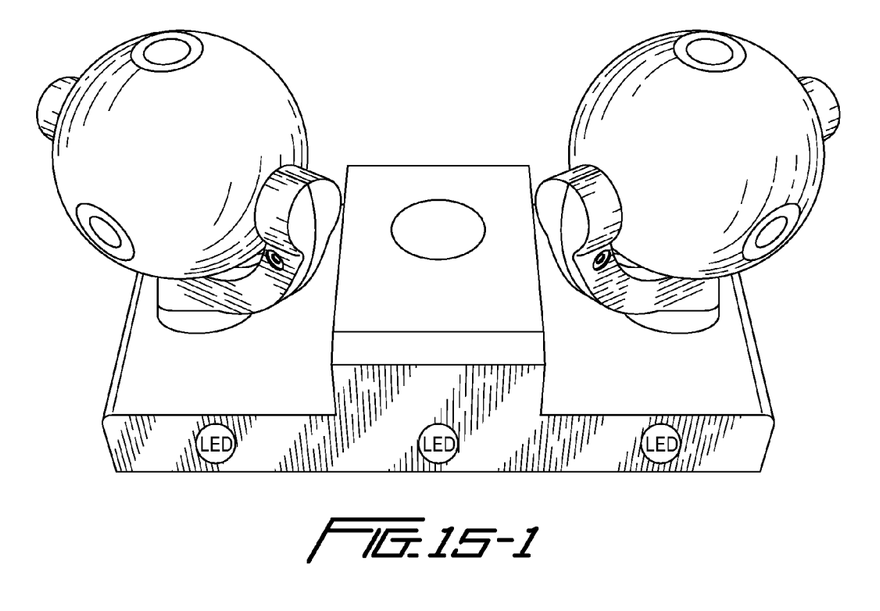
Figure 152:
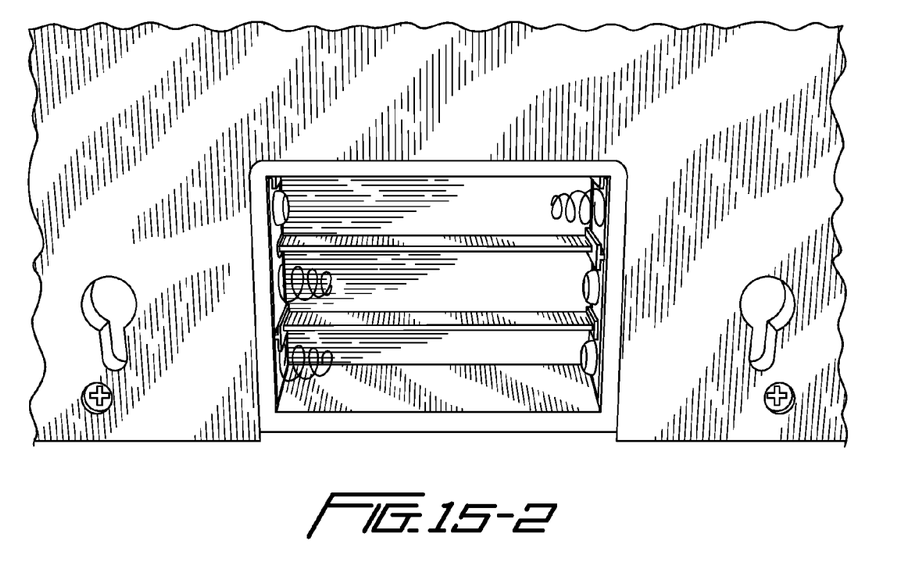
Figure 161:
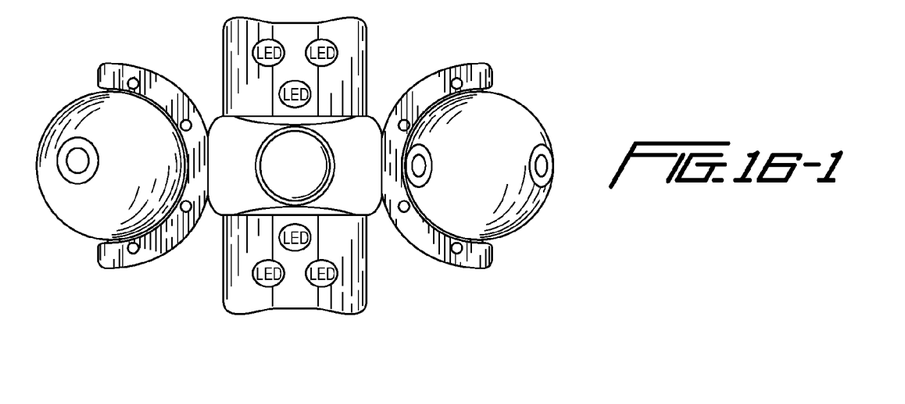
Figure 162:
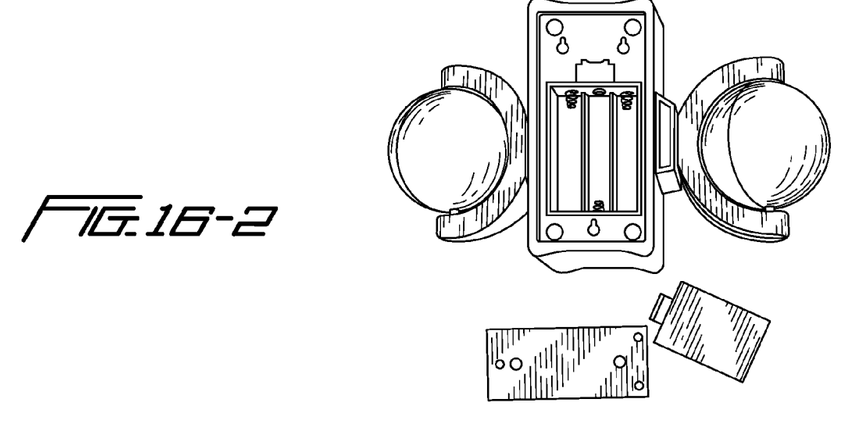
Figure 163:
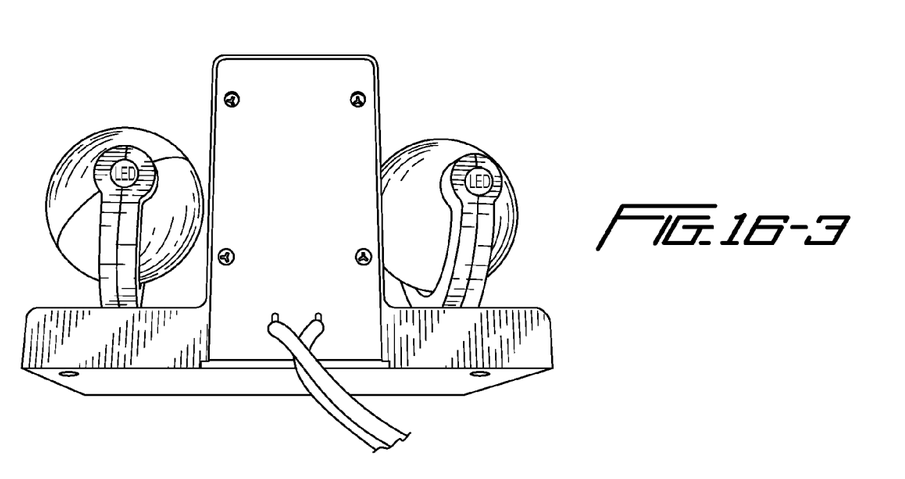

The semi-spherical parts (14-5a) (14-5a') have projection means moving grooves (14-5d). They also can have a variety of small holes (not shown), windows, or openings to allow the geometric-unit(s) to get the best ventilation to cool the high power LED(s) by airflow.

Details of the light devices shown in FIGS. 15-1, 15-2, 16-1, 16-2, and 16-3 are the same as discussed above.

Figures 12A, 12B:
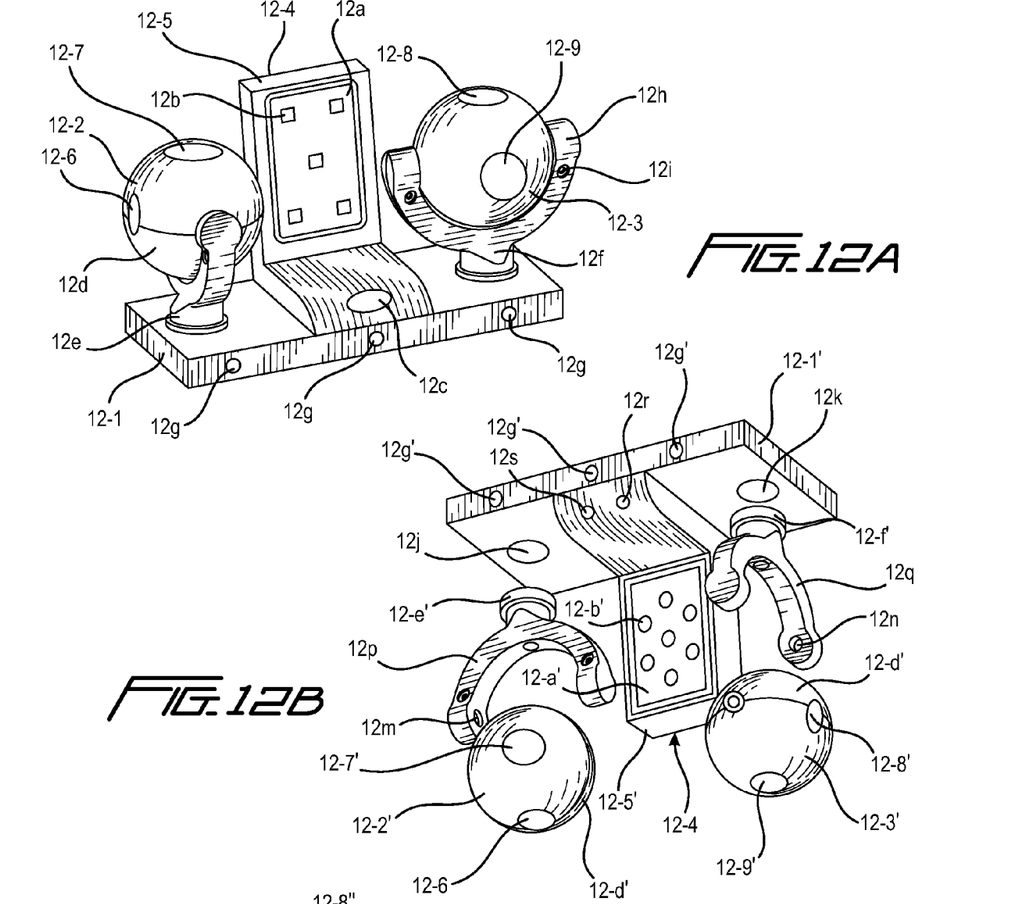
Figure 12C:
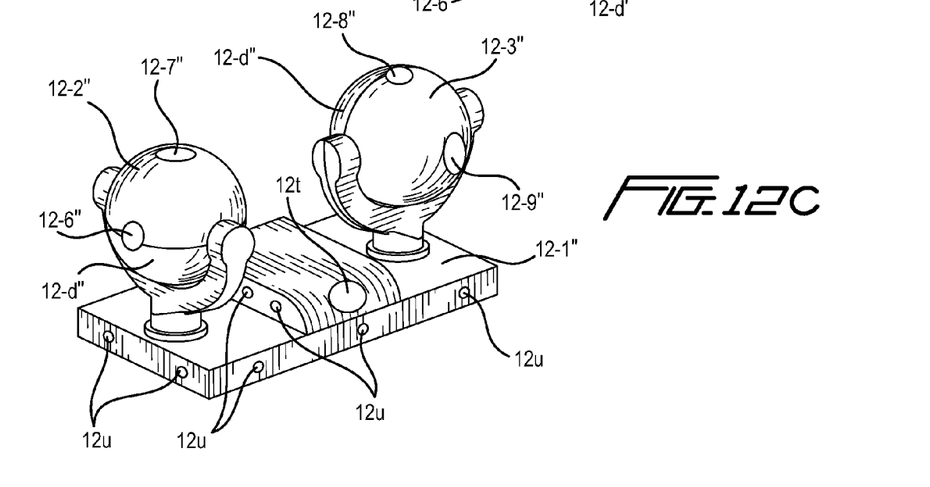
Figure 13:
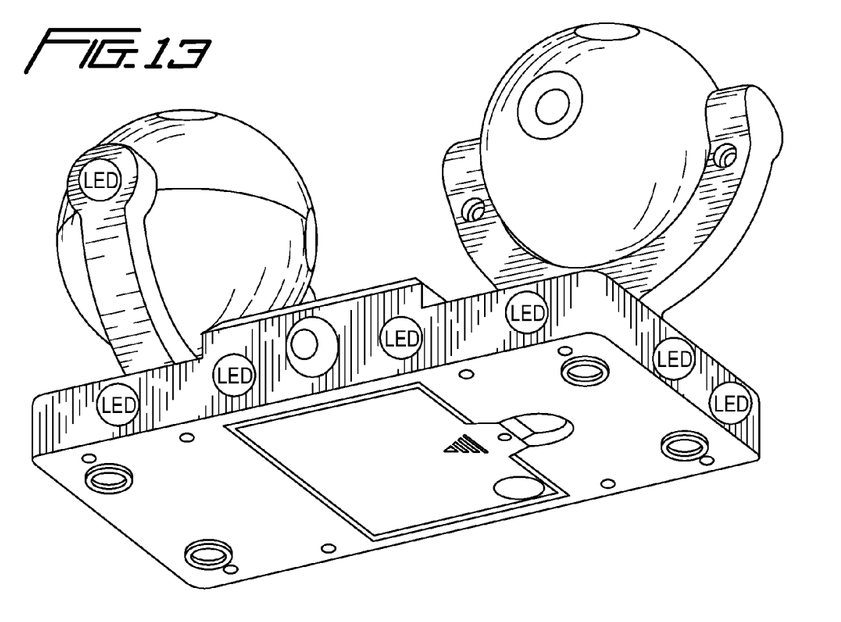

FIG. 12A shows an LED light having a geometric-unit (12a) which is an attachable and detachable unit having its own power source such as batteries and its own switch.

The geometric-unit (12a) can therefore be taken out or put into the LED light at any time, for example during an emergency to serve as a hazard warning light (earthquake sensing, flood sensing, mud flow sensing, fire sensing, ash sensing, dust sensing, or any other hazard), alone or in combination with other light devices.

Although a limited number of preferred embodiments has been described above, it will be appreciated that all alternative, equivalent, or same function light devices, arrangements, constructions, and the like will still fall within the scope of the invention.

The invention claimed is:

1. An LED light having at least one geometric-unit that includes projection means for projecting light beams to illuminate at least one distant area remote from said LED light, comprising:
at least one LED arranged to provide said light beams for projection by said at least one projection means of said at least one geometric-unit; and
power and control elements for supplying power from a power source to said at least one LED, said power and control elements including circuitry having at least one of a sensor, switch, integrated circuit, detector, a power supply cord and plug or at least one battery power supply circuit, and conductive means to cause the at least one LED to turn on and off to achieve at least one of a predetermined function, timing, duration, brightness, duty cycle, frequency, and power savings, said power source including at least one of an AC or DC source, or a generator, transformer, or adaptor and a storage device for obtaining electricity from a source of solar, wind, chemical or geothermal power,
wherein said projection means incorporates projection elements, said projection elements including means for predetermining a distance of the distant area illuminated by said light beams by focusing said light beams on said distant area, and also means for pre-determining at least one of a size, brightness, color, shape, dimensions, and direction of the distant area illuminated by said light beams, said projection elements including at least one of an optical element, lens, convex lens, concave lens, tubular holder, means for adjusting said focus of said light beams, and means for blocking extraneous light beams,
wherein said LED light is one of a power fail light, security light, motion sensor light, evacuation light, emergency light, hazard warning light, AC powered light, and DC powered light,
wherein said projection means projects said light beams only to said at least one distant area at said predetermined distance rather than a nearby area.

2. An LED light device as claimed in claim 1, wherein said geometric-unit and said projection means are arranged to be rotated about any of an x-axis, a y-axis, and a z-axis, over angles ranging from 0 to 360 degrees.

3. An LED light device as claimed in claim 1, wherein each said at least one geometric-unit has at least one said projection means.

4. An LED light device having at least one geometric-unit that includes projection means for projecting light beams to illuminate a distant area remote from said LED light, comprising:
at least one LED arranged to provide said light beams for projection by said at least one projection means of said at least one geometric-unit; and
power and control elements for supplying power from a power source to said at least one LED, said power and control elements including circuitry having at least one of a sensor, switch, integrated circuit, detector, a power supply cord and plug or at least one battery power supply circuit, and conductive means to cause the at least one LED to turn on and off to achieve at least one of a predetermined function, timing, duration, brightness, duty cycle, frequency, and power savings, said power source including at least one of an AC or DC source, or a generator, transformer, or adaptor and a storage device for obtaining electricity from a source of solar, wind, chemical or geothermal power,
wherein said projection means incorporates projection elements for pre-determining at least one of a size, brightness, color, shape, dimensions, direction, and distance of the distant area illuminated by said light beams, said projection elements including at least one of an optical element, lens, convex lens, concave lens, tubular holder, means for adjusting a focus of said light beams, and means for blocking extraneous light beams,
wherein said LED light is one of a power fail light, security light, motion sensor light, evacuation light, emergency light, hazard warning light, AC powered light, and DC powered light,
wherein said projection means projects said light beams only to said at least one distant area rather than a nearby area, and
wherein each said at least one geometric-unit has a plurality of said projection means.

5. An LED light device as claimed in claim 4, wherein at least one of said plurality of projection means has a position or orientation that is adjustable with respect to another of said plurality of projection means.

6. An LED light device as claimed in claim 1, further comprising LED means for illuminating nearby areas.

7. An LED light device as claimed in claim 1, wherein said at least one geometric-unit includes ventilation means for cooling said at least one LED.

8. An LED light device as claimed in claim 1, wherein specifications of said at least one LED are selected to provide a sufficient brightness, intensity, and viewing angle to achieve said remote illumination.

9. An LED light device having at least one geometric-unit that includes projection means for projecting light beams to illuminate a distant area remote from said LED light, comprising:
at least one LED arranged to provide said light beams for projection by said at least one projection means of said at least one geometric-unit; and
power and control elements for supplying power from a power source to said at least one LED, said power and control elements including circuitry having at least one of a sensor, switch, integrated circuit, detector, a power supply cord and plug or at least one battery power supply circuit, and conductive means to cause the at least one LED to turn on and off to achieve at least one of a predetermined function, timing, duration, brightness, duty cycle, frequency, and power savings, said power source including at least one of an AC or DC source, or a generator, transformer, or adaptor and a storage device for obtaining electricity from a source of solar, wind, chemical or geothermal power,
wherein said projection means incorporates projection elements for pre-determining at least one of a size, brightness, color, shape, dimensions, direction, and distance of the distant area illuminated by said light beams, said projection elements including at least one of an optical element, lens, convex lens, concave lens, tubular holder, means for adjusting a focus of said light beams, and means for blocking extraneous light beams,
wherein said LED light is one of a power fail light, security light, motion sensor light, evacuation light, emergency light, hazard warning light, AC powered light, and DC powered light, and
wherein said projection means projects said light beams only to said at least one distant area rather than a nearby area, and
further comprising a plurality of additional LED means arranged in a linear, dot-matrix, curved, or hill-like pattern, and reflective means for reflecting light from said LED means to achieve a patterned-light display.

10. An LED light device having a plurality of projection units that include projection means for projecting light beams to illuminate a distant area remote from said LED light, each said projection unit comprising:

at least one LED arranged to provide said light beams for projection by said at least one projection means of said at least one geometric-unit; and power and control elements for supplying power from a power source to said at least one LED, said power and control elements including circuitry having at least one of a sensor, switch, integrated circuit, detector, a power supply cord and plug or at least one battery power supply circuit, and conductive means to cause the at least one LED to turn on and off to achieve at least one of a predetermined function, timing, duration, brightness, duty cycle, frequency, and power savings, said power source including at least one of an AC or DC source, or a generator, transformer, or adaptor and a storage device for obtaining electricity from a source of solar, wind, chemical or geothermal power, wherein said projection means incorporates projection elements for pre-determining at least one of a size, brightness, color, shape, dimensions, direction, and distance of the distant area illuminated by said light beams, said projection elements including at least one of an optical element, lens, convex lens, concave lens, tubular holder, means for adjusting a focus of said light beams, and means for blocking extraneous light beams, wherein said LED light is one of a power fail light, security light, motion sensor light, evacuation light, emergency light, hazard warning light, AC powered light, and DC powered light, wherein said projection means projects said light beams only to said at least one distant area rather than a nearby area, and wherein a position, orientation, or direction of one said projection means is adjustable without interference with a position, orientation, or direction of another said projection means.

11. An LED light device having at least one geometric-unit that includes projection means for projecting light beams to illuminate a distant area remote from said LED light, comprising:

at least one LED arranged to provide said light beams for projection by said at least one projection means of said at least one geometric-unit; and power and control elements for supplying power from a power source to said at least one LED, said power and control elements including circuitry having at least one of a sensor, switch, integrated circuit, detector, a power supply cord and plug or at least one battery power supply circuit, and conductive means to cause the at least one LED to turn on and off to achieve at least one of a predetermined function, timing, duration, brightness, duty cycle, frequency, and power savings, said power source including at least one of an AC or DC source, or a generator, transformer, or adaptor and a storage device for obtaining electricity from a source of solar, wind, chemical or geothermal power, wherein said projection means incorporates projection elements for pre-determining at least one of a size, brightness, color, shape, dimensions, direction, and distance of the distant area illuminated by said light beams, said projection elements including at least one of an optical element, lens, convex lens, concave lens, tubular holder, means for adjusting a focus of said light beams, and means for blocking extraneous light beams, wherein said LED light is one of a power fail light, security light, motion sensor light, evacuation light, emergency light, hazard warning light, AC powered light, and DC powered light, wherein said projection means projects said light beams only to said at least one distant area rather than a nearby area, and wherein said at least one geometric-unit includes a groove, opening, cutout, or window for enabling movement of said projection means, and at least one overlayer and/or underlayer for covering said groove, opening, cutout, or window to prevent access by a user to an interior of said geometric-unit.

12. An LED light device as claimed in claim 1, comprising a plurality of said LEDs, said LEDs being individually disconnectable from said power supply to save power.

13. An LED light device having at least one geometric-unit that includes projection means for projecting light beams to illuminate a distant area remote from said LED light, comprising:

at least one LED arranged to provide said light beams for projection by said at least one projection means of said at least one geometric-unit; and power and control elements for supplying power from a power source to said at least one LED, said power and control elements including circuitry having at least one of a sensor, switch, integrated circuit, detector, a power supply cord and plug or at least one battery power supply circuit, and conductive means to cause the at least one LED to turn on and off to achieve at least one of a predetermined function, timing, duration, brightness, duty cycle, frequency, and power savings, said power source including at least one of an AC or DC source, or a generator, transformer, or adaptor and a storage device for obtaining electricity from a source of solar, wind, chemical or geothermal power, wherein said projection means incorporates projection elements for pre-determining at least one of a size, brightness, color, shape, dimensions, direction, and distance of the distant area illuminated by said light beams, said projection elements including at least one of an optical element, lens, convex lens, concave lens, tubular holder, means for adjusting a focus of said light beams, and means for blocking extraneous light beams, wherein said LED light is one of a power fail light, security light, motion sensor light, evacuation light, emergency light, hazard warning light, AC powered light, and DC powered light, wherein said projection means projects said light beams only to said at least one distant area rather than a nearby area, and wherein a position of said at least one LED is changeable to illuminate multiple areas at different distances.

14. An LED light device as claimed in claim 1, wherein said LED light includes a plurality of said LEDs for illuminating different remote areas at different distances from said LED light.

15. An LED light device as claimed in claim 1, wherein said at least one LED is removable from said LED light device and includes its own spare power source and switch means for individually turning on and off said at least one LED.

16. An LED light device as claimed in claim 1, further comprising a power saving circuit for causing said LED to flash at a rate faster than a response time of a human eye to cause the LED to appear to be steadily illuminated while saving power.

17. An LED light device as claimed in claim 1, comprising a plurality of said projection means for only illuminating distant areas.

18. An LED light device as claimed in claim 1, wherein said geometric-unit is detachable from said LED light device and has a built-in power source for use while the geometric-unit is detached from the LED light device.

* * * * *